United States Patent
Wild et al.

(10) Patent No.: US 11,091,046 B2
(45) Date of Patent: Aug. 17, 2021

(54) SYSTEM FOR PROVIDING AN INTERFACE TO ELECTRIC VEHICLE CHARGING STATIONS

(71) Applicant: Recargo, Inc., Venice, CA (US)

(72) Inventors: Nick Wild, Venice, CA (US); Lucas Manfield, Venice, CA (US); Armen Petrosian, Venice, CA (US); Forrest North, Venice, CA (US)

(73) Assignee: Recargo, Inc., El Segundo, CA (US)

( * ) Notice: Subject to any disclaimer, the term of this patent is extended or adjusted under 35 U.S.C. 154(b) by 164 days.

(21) Appl. No.: 14/616,258

(22) Filed: Feb. 6, 2015

(65) Prior Publication Data
US 2015/0224888 A1 Aug. 13, 2015

Related U.S. Application Data

(60) Provisional application No. 61/937,402, filed on Feb. 7, 2014.

(51) Int. Cl.
*G06Q 30/06* (2012.01)
*B60L 53/14* (2019.01)
(Continued)

(52) U.S. Cl.
CPC .......... *B60L 53/14* (2019.02); *B60L 11/1824* (2013.01); *B60L 53/305* (2019.02); *B60L 53/31* (2019.02); *B60L 53/65* (2019.02); *B60L 53/665* (2019.02); *B60L 53/67* (2019.02); *B60L 53/68* (2019.02); *G06Q 20/145* (2013.01); *G06Q 20/32* (2013.01); *G06Q 20/322* (2013.01); *G06Q 20/327* (2013.01); *G06Q 20/40* (2013.01); *G06Q 30/00* (2013.01); *G06Q 30/0639* (2013.01); *G07F 15/003* (2013.01); *G07F 15/005* (2013.01); *B60L 2240/70* (2013.01); *B60L 2240/72* (2013.01); *B60L 2250/16* (2013.01); *G06Q 30/06* (2013.01); *Y02T 10/70* (2013.01);
(Continued)

(58) Field of Classification Search
USPC ................................................ 705/26.1–27.2
See application file for complete search history.

(56) References Cited

U.S. PATENT DOCUMENTS

| | | | |
|---|---|---|---|
| 2013/0090936 A1* | 4/2013 | Solomon ................ | G06Q 30/02 705/1.1 |
| 2014/0125279 A1* | 5/2014 | Juhasz ...................... | H02J 7/00 320/109 |
| 2016/0176307 A1* | 6/2016 | Becker ................ | B60L 11/1816 320/109 |

OTHER PUBLICATIONS

B. Heater, Chargepoint lets you reserve electric charging stations, cuts down on alternative fueling fistfights Apr. 26, 2011. Engadget (Year: 2011).*

* cited by examiner

*Primary Examiner* — Allison G Wood
*Assistant Examiner* — Jason B Warren
(74) *Attorney, Agent, or Firm* — AMPACC Law Group, PLLC

(57) ABSTRACT

In some embodiments, the system and method may access a request to charge an electric vehicle at a specific charging station, identify a charging network (e.g., one of multiple, disparate charging networks) associated with the specific charging station, and automatically provide payment information to the charging network via a payment protocol associated with the charging network. The charging interface system, therefore, may facilitate access to any charging network and/or charging station by providing an interface between a driver of an electric vehicle and one of many charging networks.

9 Claims, 18 Drawing Sheets

(51) Int. Cl.
  *B60L 11/18*   (2006.01)
  *G06Q 20/40*   (2012.01)
  *G07F 15/00*   (2006.01)
  *G06Q 20/32*   (2012.01)
  *G06Q 20/14*   (2012.01)
  *B60L 53/30*   (2019.01)
  *B60L 53/68*   (2019.01)
  *B60L 53/31*   (2019.01)
  *B60L 53/66*   (2019.01)
  *B60L 53/65*   (2019.01)
  *B60L 53/67*   (2019.01)
  *G06Q 30/00*   (2012.01)

(52) U.S. Cl.
  CPC ............ *Y02T 10/7072* (2013.01); *Y02T 10/72* (2013.01); *Y02T 90/12* (2013.01); *Y02T 90/14* (2013.01); *Y02T 90/16* (2013.01); *Y02T 90/167* (2013.01); *Y04S 30/14* (2013.01)

SYSTEM FOR PROVIDING AN INTERFACE TO ELECTRIC VEHICLE CHARGING STATIONS

CROSS REFERENCE TO RELATED APPLICATIONS

This application claims priority to U.S. Provisional Patent Application No. 61/937,402, filed on Feb. 7, 2014, entitled PROVIDING AN INTERFACE TO ELECTRIC VEHICLE CHARGING STATIONS, which is hereby incorporated by reference in its entirety.

BACKGROUND

Although the adoption of electric vehicles is increasing, there are still many people that find them confusing or inaccessible, or are otherwise not interested in using electric vehicles for their transportation needs. Therefore, technology is being developed to remove such barriers associated with the adoption of electric vehicles.

DETAILED DESCRIPTION

Overview

Figure 1:
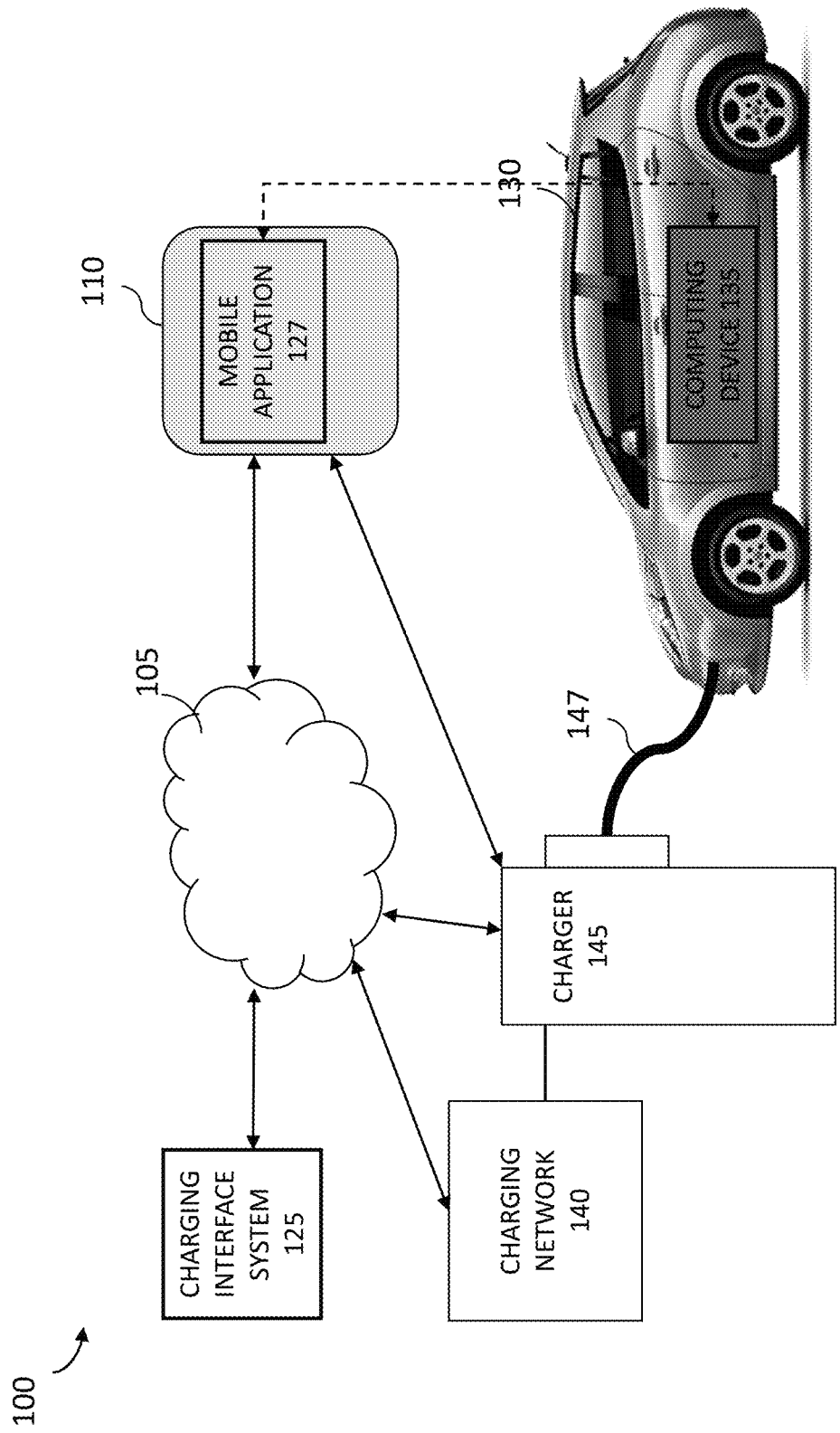
FIG. 1 is a block diagram illustrating components of a suitable computing environment.

Systems and methods for facilitating access to an electric vehicle charging network are described. In some embodiments, the system (e.g., a "charging interface system") provides an interface via which an electric vehicle (EV) may access and/or be authorized to one of multiple, disparate charging networks.

In some embodiments, the system and method may access a request to charge an electric vehicle at a specific charging station, identify a charging network (e.g., one of multiple, disparate charging networks) associated with the specific charging station, and automatically provide payment information to the charging network via a payment protocol associated with the charging network. The charging interface system, therefore, may facilitate access to any charging network and/or charging station by providing an interface between a driver of an electric vehicle and one of many charging networks.

For example, the charging interface system may automatically determine an electric vehicle is proximate to a specific charging station (e.g. using geolocation information or other information), and automatically provide payment information to the specific charging station to authorize the electric vehicle to receive charge from the specific charging station.

In some embodiments, the charging interface system may access a request to charge an electric vehicle at a charging station, authorize a first amount of charge to be provided to the electric vehicle by the charging station, and authorize a second amount of charge to be provided to the electric vehicle in response to receiving payment information associated with charging the electric vehicle at the charging station. The charging interface system, therefore, may pre-authorize, or cause a charging station to authorize an EV and/or initiate charging (e.g., the "first amount of charge") of an EV, before or during the EV is actually or successfully authorized to utilize the charging station, such as before or during a successful transmission of registration and/or payment information.

In some embodiments, the charging interface system may identify multiple charging stations proximate to an electric vehicle, pre-authorize the electric vehicle at one or more of the multiple charging stations, and cause icons representing the one or more charging stations at which the electric vehicle is pre-authorized to be displayed on a map presented by the mobile application via a user interface of a mobile device that supports the mobile application. The charging interface system, therefore, may present information identifying various types or functionalities of charging stations (e.g., pre-authorized stations, stations that receive payment from the charging interface system, and so on) via a map displayed by a mobile application, enabling drivers of EVs to identify and find charging stations and/or charging networks that provide efficient, cost-effective, and/or advantageous charging services, among other benefits.

In some embodiments, the charging interface system includes and/or provides a hardware device that facilitates the access, authorization, and/or payment of services provided by one or more charging stations at a location.

The charging interface system and various performed methods will now be described with respect to various embodiments. The following description provides specific details for a thorough understanding of, and enabling description for, these embodiments of the system. However, one skilled in the art will understand that the system may be practiced without these details. In other instances, well-known structures and functions have not been shown or described in detail to avoid unnecessarily obscuring the description of the embodiments of the system.

It is intended that the terminology used in the description presented below be interpreted in its broadest reasonable manner, even though it is being used in conjunction with a detailed description of certain specific embodiments of the system. Certain terms may even be emphasized below; however, any terminology intended to be interpreted in any restricted manner will be overtly and specifically defined as such in this Detailed Description section.

Suitable System

As described herein, a charging interface system that facilitates the authorization and/or registration of an electric vehicle to a charging network and associated charging stations, as well as facilitates the payment for services provided by a charging network or charging station, is described.

FIG. 1 illustrates components of a suitable computing environment 100 in which a charging interface system 125 may be supported and/or implemented. The computing environment 100 includes a mobile device 110, such as a mobile phone or tablet computer that supports and provides applications (e.g., "apps") to a user of the mobile device 110. For example, the mobile device 110 may include a mobile application 127 provided by the charging interface system 125. The mobile application 127 may communicate with the charging interface system 125, one or more charging networks 140, a charging station 145, and/or a computing device 135 supported by an electric vehicle 130, over a network 105, such as the internet or other wireless or telecommunication networks. The electric vehicle (EV) 130 (e.g., a vehicle, plugin hybrid, range extended hybrid, electric traction or battery or plugin vehicle) is connected to the charging station 145 via a charging cable 147, which provides charge to a battery pack of the EV 130.

The mobile device 110 may be a tablet computer, mobile device, smart-phone, net-book, mobile GPS navigation device, or any other device that supports, presents, and/or displays apps via a user interface, such as a touch-screen, of the device. The mobile device 110 includes various hardware and/or software components in order to provide such functionality. For example, the mobile device 110 includes various human interface components, device components, and memory, and so on.

The mobile device 110 may include a touch-screen or other input component that provides input to a processor. The touch-screen may include or communicate with a hardware controller, such as a touch-screen driver, that interprets raw signals received from the touch-screen and transmits information associated with a contact event (e.g., a pressing of an app via the touch-screen), to the processor. The touch-screen may be part of a display, such as a touch-screen display, a flat panel display, an electronic ink display, a head-mounted display, a liquid crystal display, a light-emitting diode display, a plasma panel display, an electroluminescent display, a vacuum fluorescent display, a digital projector, a laser projector, a heads-up display, and so on. The mobile device 110 may include other interface components, such as a speaker that provides appropriate auditory signals to assist a user in navigating a touch-screen, and so on.

The mobile device 110 may include various device components, such as sensors (e.g., GPS or other location determination sensors, motion sensors, gyroscopes, light sensors, and so on), removable storage devices (e.g., SIM cards), cameras and other video capture devices, microphones and other audio capture devices, communication devices (e.g., Bluetooth devices, radios, antennas), and so on.

The mobile device 110 may include a processor that communicates with data or applications stored in memory of the device 110, which may include a combination of temporary and/or permanent storage, and both read-only and writable memory (random access memory or RAM), read-only memory (ROM), writable non-volatile memory such as FLASH memory, hard drives, floppy disks, SIM-based components, and so on. The memory may include various program components or modules, such as an operating system, and various applications, such as applications downloaded to the device 110. For example, the memory may store applications native to the device that perpetually operate on the device (e.g., a keyboard application that provides a virtual keyboard, a text messaging application, and so on) as well as applications that are downloaded by a user and launched by the device (e.g., applications associated with social networking sites, games, and so on).

The memory may store one or more applications associated with an electric vehicle, such as the mobile application 127, which facilitates communications between the mobile device 110 and an electric vehicle 130, the computing device 135 of the electric vehicle 130, the charging network 140, the charging station 145, and/or a server supporting the charging interface system 125.

For example, the mobile application 127 may communicate over the network 105 with the computing device 135 of the electric vehicle 130, the charging network 140, the charging station 145, and/or the charging interface system 125. The network 105 may be a Local Area Network (LAN), a Wide Area Network (WAN), the Internet, or other networks capable of facilitating various communications between computing devices.

In some embodiments, the mobile application 127 may communicate directly with various components of the computing environment 100. The mobile device 110 may include various communication components (e.g., Bluetooth) that facilitate short range, near field, and/or other direct or personal area network communications between devices. For example, the mobile application 127 may utilize Bluetooth communication to exchange data with the charging network 140 and/or the charging station 145 when other networks are unavailable or inaccessible (e.g., when the EV 130 is at the charging station 145 in an underground parking lot that does not receive sufficient wireless or telecommunication signals).

The computing device 135 of the electric vehicle 130 may include various computing components and/or modules configured and/or programmed to control, manage, diagnose, or otherwise interact with components of the electric vehicle 130. For example, the EV computing device 135 may include an on-board computing system that includes on-board diagnostics, such as components configured and/or programmed to detect and/or receive information from the electric vehicle's engine, battery pack, various sensors, dashboard controls, and so on. The components may detect, sense, and/or capture various types of information, such as outside temperature information, inside temperature information, internal engine or component temperatures, motor rpm information, motor temperature information, power consumption information, charger temperature information, information associated with peak power consumption, location or geographical information, tire pressure information, tire temperature information, information captured by seat pressure sensors, error codes or other operational information, and so on. For example, the components may detect, receive, and/or access motor controller information, such as information associated with the power, voltage, current, frequency, waveform, modulation, and/or regenerative power of the motor of the EV, as well as information from modules which control ancillary functions of the EV, such as information associated with operations of the lights, wipers, anti-lock brakes, seat warmers, music, climate controls, light sensors, smoke sensors, acceleration sensors, and other ancillary operations of an EV.

The computing device 135 may also include various direct communication components, such as radios or other data transmission devices (e.g., Bluetooth, Wi-Fi-, two-way, and so on) configured and/or programmed to transmit information from the EV computing device 135 to devices located remotely from the electric vehicle 130, such as the mobile device 110, the charging network 140, the charging station 145, and so on.

Figure 2:
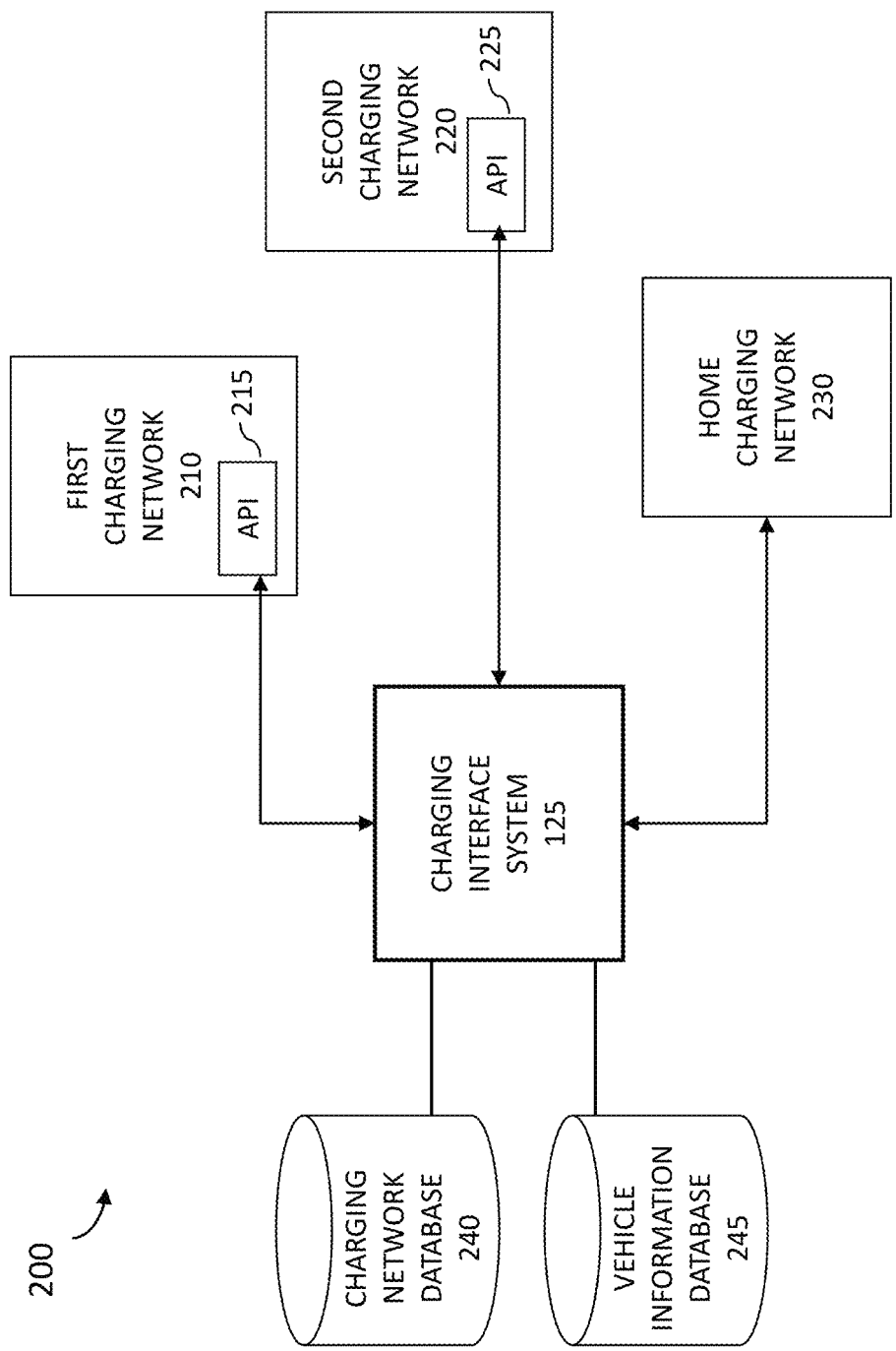
FIG. 2 is a block diagram illustrating interactions between multiple charging networks and a charging interface system.

FIG. 2 is a block diagram 200 illustrating interactions, communications, and/or data exchanges between multiple charging networks and the charging interface system 125. The charging interface system 125 facilitates communications associated with the payment for charging services and/or other authorization processes with multiple, disparate charging networks, such as a first charging network 210, a second charging network 220, and/or a home charging network 230. The charging interface system 125 may communicate with the various charging networks (or, their associated charging stations) via application programming interfaces (APIs) 215, 225, in order to provide and/or obtain data from the charging networks 210, 220. For example, the charging interface system 125 may call API 215 to obtain information associated with the cost to charge at a charging station provided by the charging network 215, to obtain payment or registration protocol information associated with information required to register a driver or EV with the charging network 215, and so on.

The charging interface system 125 may store, access, retrieve, and/or obtain data and information from various associated data storage components, such as a charging network database 240 and a vehicle information database 245, among other information databases. The charging network database 240 may store or contain information associated with and/or previously or currently obtained multiple charging networks 210, 220, 230, such as cost to charge information, registration protocol information, payment protocol information, review or rating information, API or access information, and other information described herein. The vehicle information database 240 may store or contain information associated with electric vehicles supported and/or part of a network of EVs that supports and/or provides the charging interface system 125, such as identification information, driver information, historical use or charging information, payment information (e.g., credit card account information, bank account information, network payment credits or tokens, and so on), current route or travel information, and other information described herein.

Thus, in some embodiments, the charging interface system 125 provides a common and/or abstract user interface for charging session payment, activation, monitoring, authorization, and/or registration, across multiple, disparate charging networks having multiple, disparate charging, payment, registration, and/or authorization protocols and/or requirements. For example, the charging interface system 125 may provide a scalable platform capable of adding or supporting charging networks by simply dropping in an API Wrapper/Driver or other communication information to the interface. The charging interface system 125, therefore, may provide a driver of an EV with a common payment experience and/or common session monitoring and session history information without requiring the driver to be a member of multiple charging networks and/or perform various time consuming tasks associated with registering or authorizing his/her EV to a new or unknown charging network when attempting to utilize a charging station, among other benefits.

FIG. 1, FIG. 2, and the discussion herein provide a brief, general description of a suitable computing environment in which the charging interface system 125 can be supported and implemented. Although not required, aspects of the system are described in the general context of computer-executable instructions, such as routines executed by a general-purpose computer, e.g., mobile device, a server computer, or personal computer. Those skilled in the relevant art will appreciate that the system can be practiced with other communications, data processing, or computer system configurations, including: Internet appliances, hand-held devices (including tablet computers and/or personal digital assistants (PDAs)), all manner of cellular or mobile phones, multi-processor systems, microprocessor-based or programmable consumer electronics, set-top boxes, network PCs, mini-computers, mainframe computers, and the like. Indeed, the terms "computer," "host," and "host computer," and "mobile device" and "handset" are generally used interchangeably herein, and refer to any of the above devices and systems, as well as any data processor.

Aspects of the system can be embodied in a special purpose computing device or data processor that is specifically programmed, configured, or constructed to perform one or more of the computer-executable instructions explained in detail herein. Aspects of the system may also be practiced in distributed computing environments where tasks or modules are performed by remote processing devices, which are linked through a communications network, such as a Local Area Network (LAN), Wide Area Network (WAN), or the Internet. In a distributed computing environment, program modules may be located in both local and remote memory storage devices.

Aspects of the system may be stored or distributed on computer-readable media (e.g., physical and/or tangible computer-readable storage media, such as non-transitory media), including magnetically or optically readable computer discs, hard-wired or preprogrammed chips (e.g., EEPROM semiconductor chips), nanotechnology memory, biological memory, or other data storage media. Indeed, computer implemented instructions, data structures, screen displays, and other data under aspects of the system may be distributed over the Internet or over other networks (including wireless networks) or they may be provided on any analog or digital network (packet switched, circuit switched, or other scheme). Those skilled in the relevant art will recognize that portions of the system reside on a server computer, while corresponding portions reside on a client computer such as a mobile or portable device, and thus, while certain hardware platforms are described herein, aspects of the system are equally applicable to nodes on a network. In an alternative embodiment, the mobile device or portable device may represent the server portion, while the server may represent the client portion.

Examples of Facilitating Access to Electric Vehicle Charging Services

Figure 3:
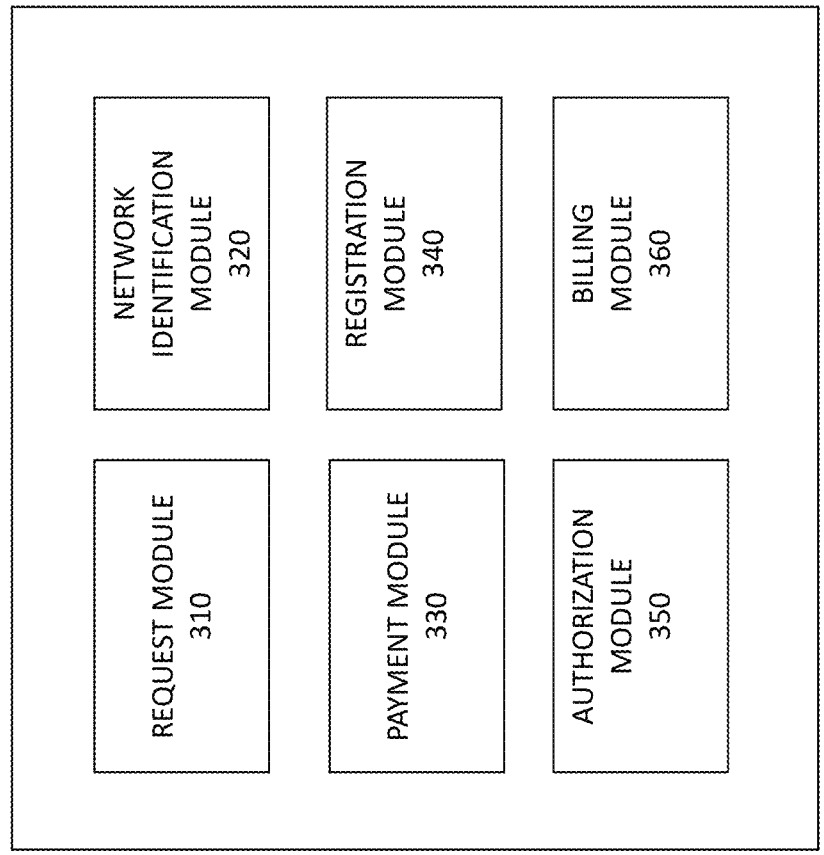
FIG. 3 is a block diagram illustrating modules of the charging interface system.

As described herein, in some embodiments, the charging interface system 125 provides a common interface via which an electric vehicle accesses any of multiple, disparate charging networks. FIG. 3 is a block diagram illustrating modules of the charging interface system 125. As illustrated in FIG. 3, the charging interface system 125 includes a variety of functional modules. One skilled in the art will appreciate that the functional modules are implemented with a combination of software (e.g., executable instructions, or computer code) and hardware (e.g., at least a memory and processor). Accordingly, as used herein, in some embodiments a module is a processor-implemented module and represents a computing device having a processor that is at least temporarily configured and/or programmed by executable instructions stored in memory to perform one or more of the particular functions that are described herein.

In some embodiments, a request module 310 is configured and/or programmed to access a request to charge an electric vehicle at a specific charging station. For example, the request module 310 may access a request received from a driver of an EV that is received by the mobile application 127, such as a selection of an icon representing a charging station that is displayed by a map presented by the mobile application 127.

In some embodiments, a network identification module 320 is configured and/or programmed to identify a charging network associated with the specific charging station. The network identification module 320 may identify the charging network in a variety of ways. For example, the network identification module 320 may access information stored in the charging network database 240 and/or in the mobile application 127 that identifies the charging network providing the requested charging station, may identify the charging network based on a determined location of the charging station, may exchange data with the charging station to obtain information identifying the charging network providing the charging station, and so on.

In some embodiments, a payment module 330 is configured and/or programmed to automatically provide payment information to the charging network via a payment protocol associated with the charging network. For example, the payment module 330 may call an API provided by the charging network to retrieve information identifying the payment protocol and/or obtain the information via the charging network database 245, retrieve payment information for the electric vehicle that satisfies the payment protocol via the vehicle information database 240 and/or directly from the driver via a presented user interface, and provide the retrieved payment information that satisfies the payment protocol to the charging network.

For example, upon identifying the charging network associated with the requested charging station, the payment module 330 may facilitate the payment of receiving charging services from the charging station for charging by retrieving information identifying the payment protocol for the charging network from the database 240 storing payment protocol information for the identified charging network, retrieving payment information for the electric vehicle that satisfies the payment protocol from the database 245 storing payment information for the requesting electric vehicle, and providing the retrieved payment information that satisfies the payment protocol to the charging network (e.g., to a payment processing component of the charging network).

At times, a charging network may require and/or request that an electric vehicle and/or associated driver be a registered user or member of the charging network in order to utilize the charging station provided by the charging network. As described herein, the charging interface system 125, therefore, provides an interface to automatically register electric vehicles and/or associated drivers to these charging networks. For example, the charging interface system 125 may include a registration module 340 configured and/or programmed to identify a registration protocol associated with the charging network (e.g., via information stored in database 240), capture, access, or obtain information for the electric vehicle that is identified by the registration protocol (e.g., via the database 245 or via driver input received by the mobile application 127), and (automatically) register the electric vehicle with the charging network, such as before providing the payment information to the charging network, by providing the captured information the charging network.

As described herein, the charging interface system 125 may include components configured to pre-authorize an electric vehicle with a charging station and/or charging network. For example, the charging interface system 125 includes an authorization module 350 configured and/or programmed to authorize a first amount of charge to be provided to the electric vehicle by the charging station, and authorize a second amount of charge to be provided to the electric vehicle in response to receiving payment information associated with charging the electric vehicle at the charging station.

The authorization module 350, therefore, may pre-authorize and/or cause a charging station to pre-authorize or allow a first amount of charge (e.g., a small amount of charge) to be provided to the electric vehicle before receiving the payment information associated with charging the electric vehicle at the charging station. The pre-authorized amount of charge may be a small amount of charge (e.g., 1-10 percent of a total charge request or need, such as 5-15 minutes of charging time), and may be selected and/or determined based on a variety of factors. For example, the charging interface system 125 may pre-authorize a certain or initial amount of charge for drivers of electric vehicles that are members of a charging network that provides the charging station.

As another example, the authorization module 350 may be configured to authorize a first charging duration as the first amount of charge when a request to charge is received by the request module from an unknown electric vehicle, and may be configured to authorize a second charging duration greater than the first charging duration as the first amount of charge when a request to charge is received by the request module from a known electric vehicle.

In some embodiments, a charging network and/or associated charging station may pre-authorize a certain or initial amount of charge when a charging request is received from a third party network that includes a driver of the electric vehicle as a member of the third party network (e.g., such as a network providing aspects of the charging interface system 125 described herein).

In some embodiments, the charging interface system 125 includes a billing module 360 configured and/or programmed to bill a driver of the electric vehicle for the first amount of charge and the second amount of charge using the received payment information. For example, although an initial, or first amount of charge is pre-authorized, the billing module 360 requests payment for the entire amount of charge received by the electric vehicle.

In some embodiments, various modules and/or functions may be located and/or performed at or by the charging interface system 125, the mobile application 127, the charging network 140, the charging station 145, the electric vehicle and/or associated computing device 135. For example, the mobile application 127 of the mobile device 110 includes the request module 310, the network identification module 320 (and associated databases 240, 245), and the payment module 330. As another example, the mobile application 127 includes the request module 310, and a remote server supporting the charging interface system 125 includes the network identification module 320 and the payment module 330. As a further example, the charging station 145 includes the authorization module 350 and the charging network 140 includes the billing module 360.

Figure 4:
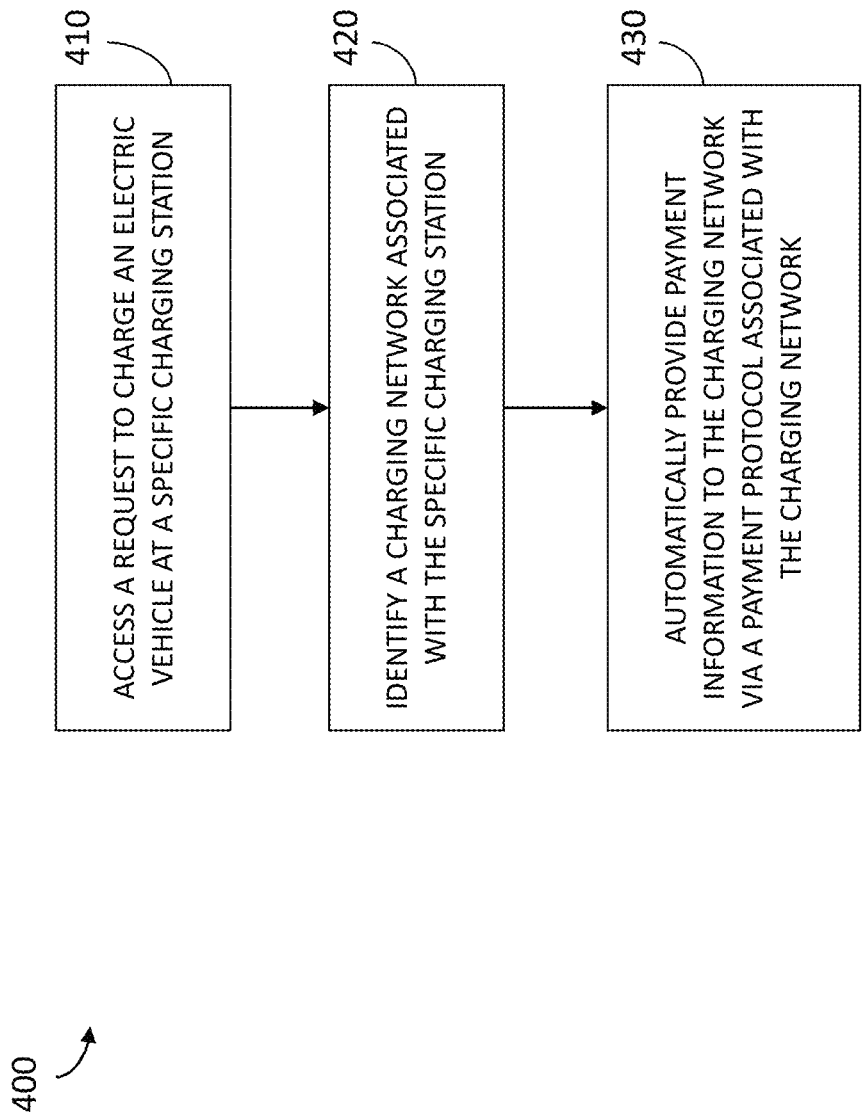
FIG. 4 is a flow diagram illustrating a method for facilitating payment for charging services from a charging station.

As described herein, the charging interface system 125 performs various processes and methods to facilitate and/or simplify access to charging services provided by various disparate charging networks. FIG. 4 is a flow diagram illustrating a method 400 for facilitating payment for charging services from a charging station.

In operation 410, the charging interface system 125 accesses a request to charge an electric vehicle at a specific charging station. For example, the request module 310 may access a request received from a driver of an EV that is received by the mobile application 127, such as a selection of an icon representing a charging station that is displayed by a map presented by the mobile application 127.

In operation 420, the charging interface system 125 identifies a charging network associated with the specific charging station. For example, the network identification module 320 may access information stored in the charging network database 240 and/or in the mobile application 127 that identifies the charging network providing the requested charging station, may identify the charging network based on a determined location of the charging station or current location of the EV 130 or mobile device 110, may exchange data with the charging station to obtain information identifying the charging network providing the charging station, and so on.

In operation 430, the charging interface system 125 automatically provides payment information to the charging network via a payment protocol associated with the charging network. For example, the payment module 330 may call an API provided by the charging network to retrieve information identifying the payment protocol and/or obtain the information via the charging network database 245, retrieve payment information for the electric vehicle that satisfies the payment protocol via the vehicle information database 240 and/or directly from the driver via a presented user interface, and provide the retrieved payment information that satisfies the payment protocol to the charging network automatically and without further user input.

In some embodiments, the charging interface system 125, or a third party that provides the charging interface system 125 and/or mobile application 127, such as a network of electric vehicles and associated drivers, may perform cover or provide payment to the charging network when necessary. For example, the charging interface system 125 may determine that an account associated with the electric vehicle lacks sufficient payment information (e.g., a stored credit card has expired) or lacks sufficient funds (e.g., has insufficient credits or tokens) and provide the payment information or funds on behalf of the electric vehicle. The charging interface system 125 may later attempt to recoup any provided funds or obtain payment information from the driver of the electric vehicle at a later time.

Thus, in some embodiments, the charging interface system 125 may access a request to charge an electric vehicle at a specific charging station provided by a driver of the electric vehicle via a mobile application associated with an interface system that identifies the charging network, and automatically provide payment information to the charging network without further user input.

Figure 5:
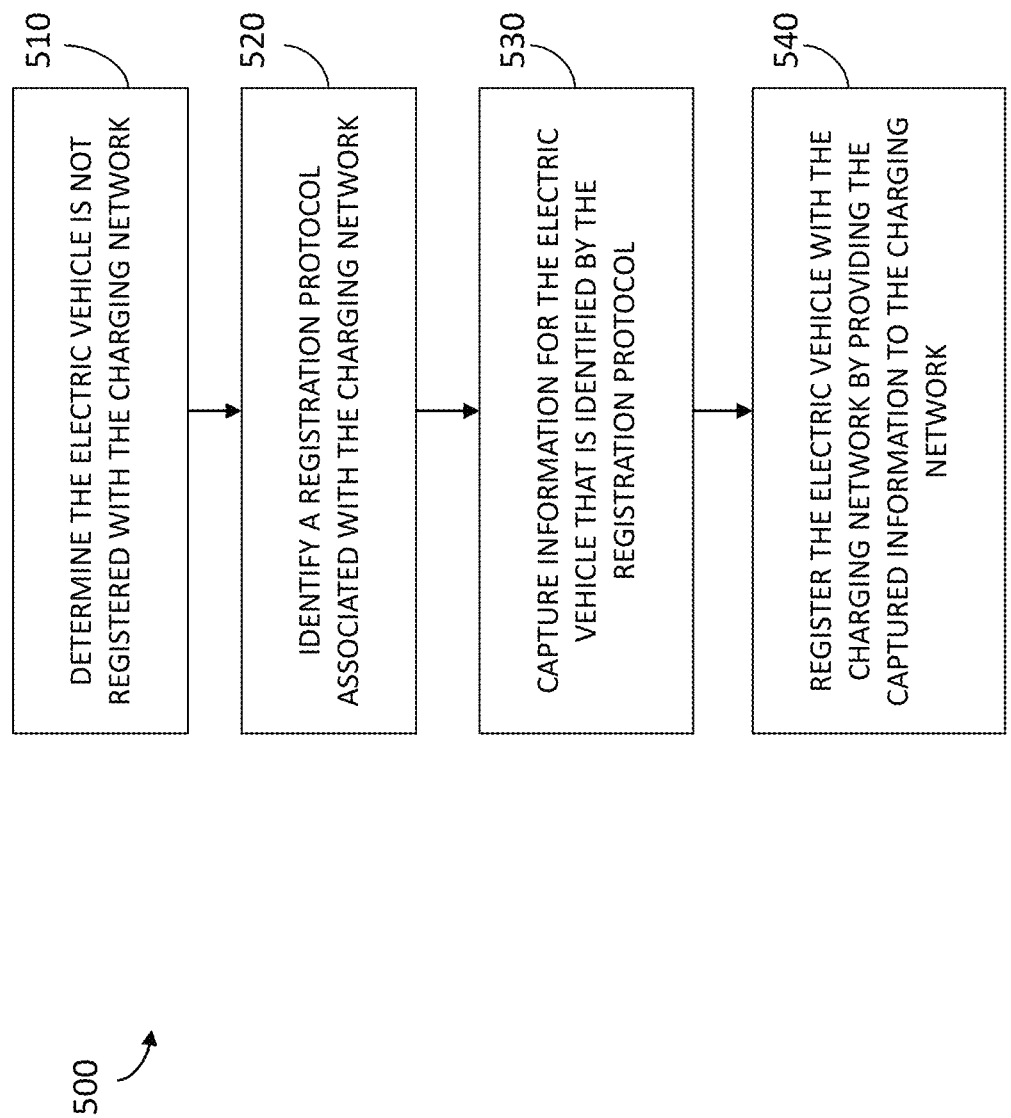
FIG. 5 is a flow diagram illustrating a method for registering an electric vehicle with one of multiple, disparate charging networks.

As described herein, a charging network may require and/or request that an electric vehicle and/or associated driver be a registered user or member of the charging network in order to utilize the charging station provided by the charging network. As described herein, the charging interface system 125, therefore, provides an interface to automatically register electric vehicles and/or associated drivers to these charging networks. FIG. 5 is a flow diagram illustrating a method 500 for registering an electric vehicle with one of multiple, disparate charging networks.

In operation 510, and before providing the payment information to the charging network, the charging interface system 125 may determine an electric vehicle is not registered with the charging network. For example, the registration module 340 125 may query database 245 and determine the electric vehicle is not registered with the charging network and/or receive information from the charging network that indicates the electric vehicle is unknown to the charging network, such as an alert and/or a prompt to register with the charging network.

In operation 520, the charging interface system 125 identifies a registration protocol associated with the charging network. For example, the registration module 340 may call an API provided by the charging network to obtain a current registration protocol that identifies a sequence of steps to be performed when registering with the charging network and/or query database 240 to obtain stored protocol information for the charging network. Example steps to be performed when registering include providing biographical information for the driver, providing identification information for the electric vehicle, providing payment information and/or account information, and so on.

In operation 530, the charging interface system 125 captures information for the electric vehicle that is identified by the registration protocol. For example, the registration module 340 may obtain the information from the database 245, may request and obtain the information from driver input received by the mobile application 127, and so on.

In operation 540, the charging interface system 125 registers the electric vehicle with the charging network by providing the captured information to the charging network. For example, the registration module 340 and/or the payment module 330 provides the captured information to the charging network automatically and without further user input in order to register the electric vehicle or associated driver with the charging network.

Figure 6:
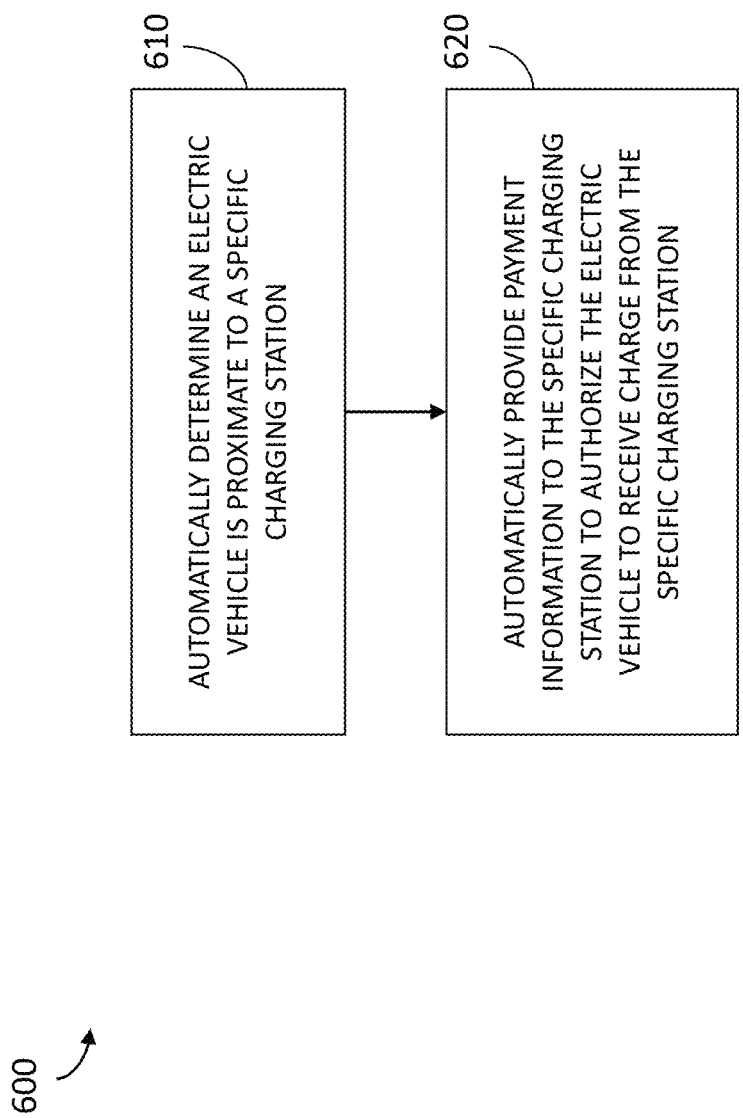
FIG. 6 is a flow diagram illustrating a method for facilitating the authorization of an electric vehicle to utilize a charging station.

As described herein, the charging interface system 125 utilizes information associated with various different charging networks and electric vehicles in order to provide a common interface between the EVs and the charging networks, in order to facilitate an efficient, simple interaction between the EVs and charging services providing by the charging networks. FIG. 6 is a flow diagram illustrating a method 600 for facilitating the authorization of an electric vehicle to utilize a charging station.

In operation 610, the charging interface system 125 automatically determines an electric vehicle is proximate to a specific charging station. For example, the mobile application 127 may track the location of the electric vehicle to one or more specific charging stations, and display such location information via a map presented by the mobile device 110 that is associated with the driver of the electric vehicle.

In operation 620, the charging interface system 125 automatically provides payment information to the specific charging station to authorize the electric vehicle to receive charge from the specific charging station. For example, the charging interface system 125 may identify the charging station is within a predetermined distance to the electric vehicle (e.g., located at a parking spot where the EV is parked) and automatically perform some or all of the processes described herein to provide payment information to the charging network that provides the specific charging station. Once the EV is authorized based on the provided payment information, the mobile application 127 may display status information that indicates the EV is authorized with the specific charging station, and charging may commence.

Figure 7:
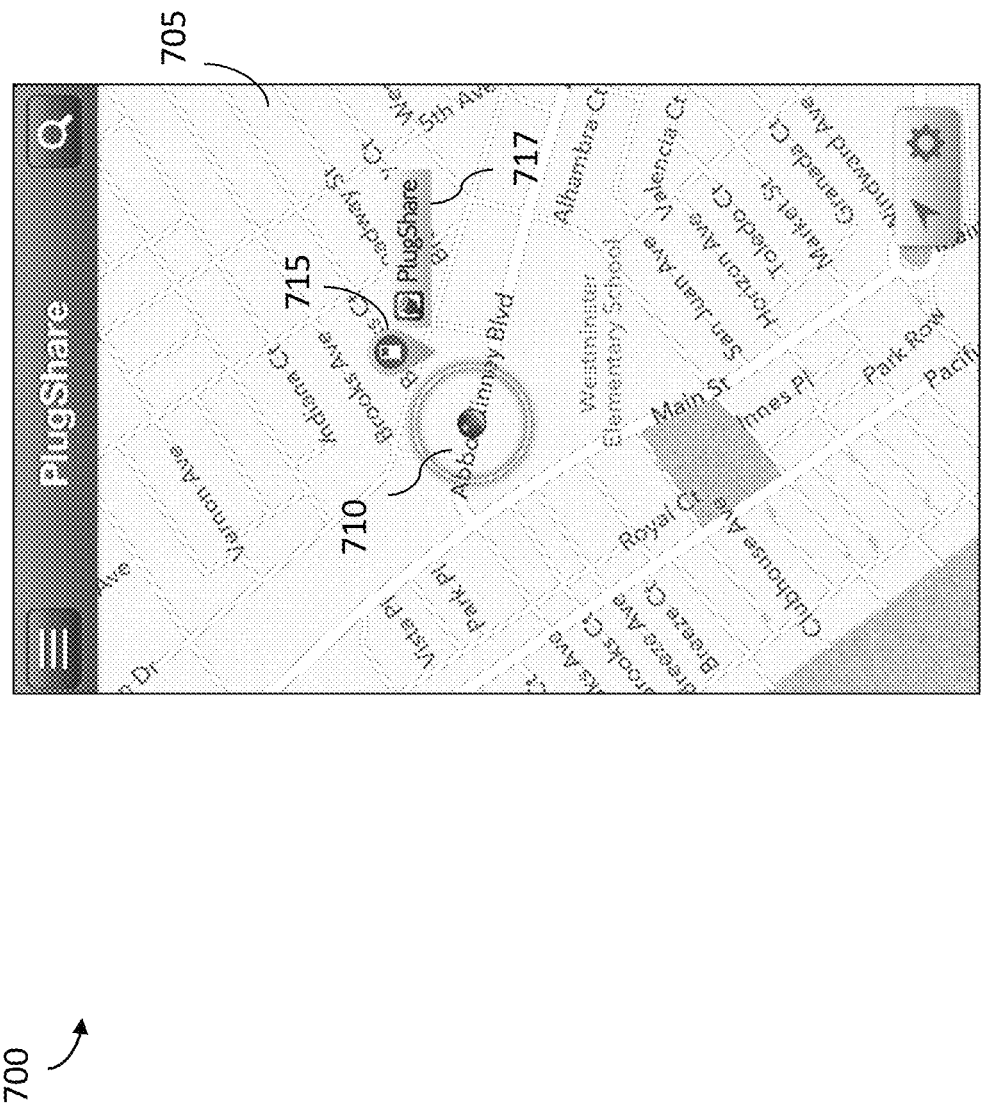
FIG. 7 is a display diagram illustrating a user interface presented by a mobile application that displays a map of available charging stations.

As described herein, the mobile application 127 may, in collaboration with the charging interface system 125, render, display, and/or present (or, cause to present) various UIs when performing the operations described herein. For example, FIG. 7 depicts a user interface 700 that displays a map of available charging stations, such as charging stations that permit receiving information on behalf of a driver from the mobile application 127. As shown in FIG. 7, the user interface displays a map 705 of a geographical location surrounding an electric vehicle, which is represented by icon 710. The map displays an icon 715 for an available charging station, along with a symbol 717 that indicates the charging station 715 may receive payments via the common interface described herein.

Figure 8:
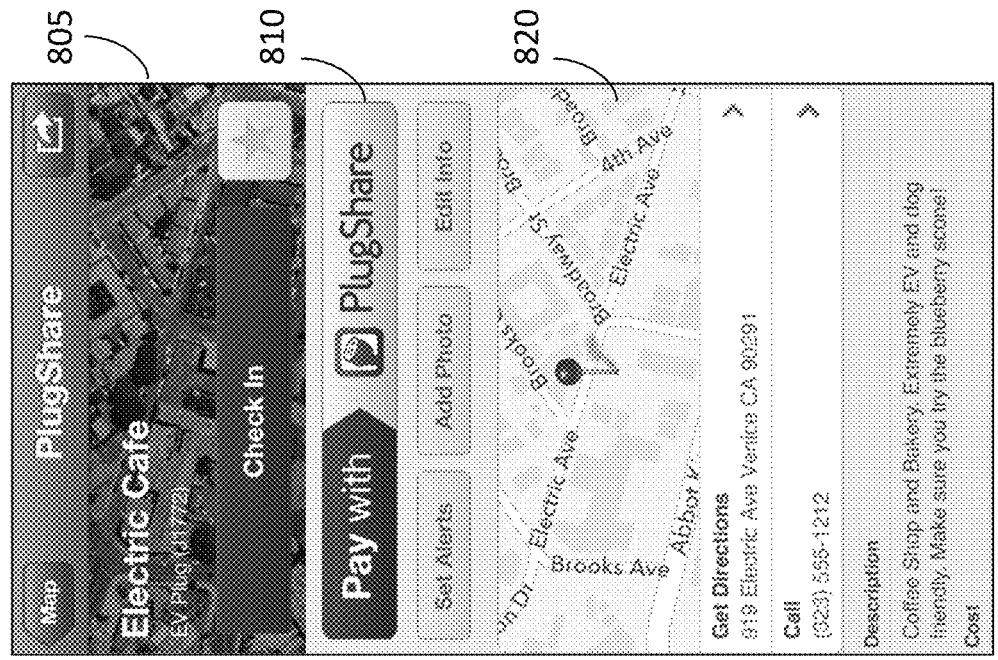
FIG. 8 is a display diagram illustrating a user interface presented by a mobile application that displays information for a selected charging station.

As another example, FIG. 8 depicts a user interface 800 that displays information for a selected charging station, such as the charging station 715 of FIG. 7. As shown in FIG. 8, the user interface 800 displays information about the charging station 715, such as a name 805 for the charging station, location and other description information 820 for the charging station, and a user-selectable element 810 that is configured to be selected by a driver of an electric vehicle when submitting a request to charge at the charging station 715. Thus, once a driver selects element 810, the charging interface system 125 performs one or more of the operations described herein to authorize the electric vehicle with the charging station 715.

Of course, the mobile application 127 may present other UIs not specifically depicted herein, such as UIs that present status information for an ongoing payment process, UIs that present status information for an ongoing registration process, UIs that present status information for various electric vehicle functions (e.g., amount of charge), UIs that display other maps or map displayed information, UIs that facilitate the receipt of user input (e.g., credit card information, login credentials, registration information and so on), and so on.

Figure 9:
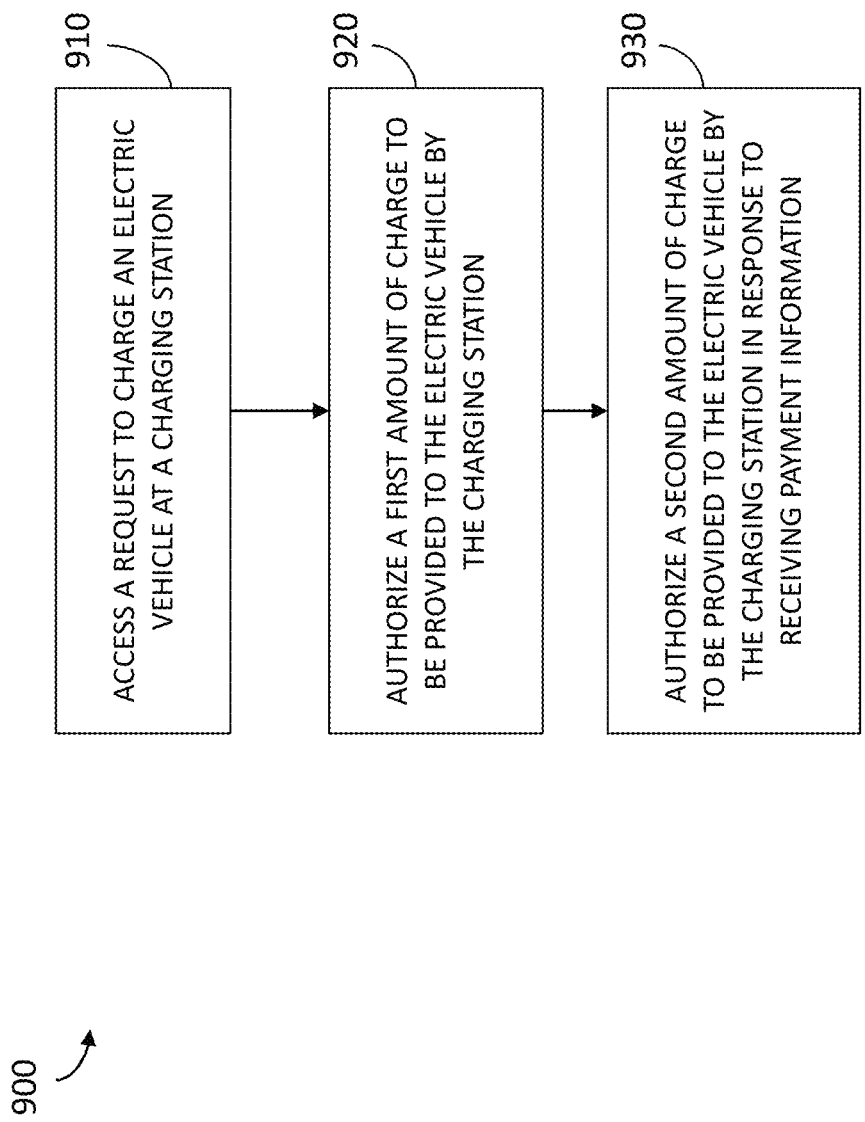
FIG. 9 is a flow diagram illustrating a method for pre-authorizing an electric vehicle for services provided by a charging station.

As described herein, in some embodiments, the charging interface system 125 performs various processes to pre-authorize an electric vehicle with a charging station or charging network, enabling a charging session to begin without typical delays associated with the authorization, registration, and/or payment for charging services, among other benefits. FIG. 9 is a flow diagram illustrating a method 900 for pre-authorizing an electric vehicle for services provided by a charging station.

In operation 910, the charging interface system 125 accesses a request to charge an electric vehicle at a charging station. For example, the request module 310 may access a request received from a driver of an EV that is received by the mobile application 127, such as a selection of an icon representing a charging station that is displayed by a map presented by the mobile application 127.

In operation 920, the charging interface system 125 authorizes a first amount of charge to be provided to the electric vehicle by the charging station. For example, the authorization module 950 may authorize and/or provide a certain initial amount of charge without or before receiving payment or other information associated with the electric vehicle.

In some embodiments, the authorization module 950 authorizes the first amount of charge for drivers of electric vehicles that are members of a charging network that provides the charging station, or for drivers known or registered with the charging interface system 125, for drivers that are members of a third party network that supports the charging interface system 125, and so on.

In some embodiments, the authorization module 950 authorizes the first amount of charge for drivers of electric vehicles that are currently registering or providing payment information, among other actions. For example, the authorization module 950 may authorize the commencement of charging based on a driver of the electric vehicle performing one or more actions associated with registering as a user of a charging network providing the charging station and/or based on a driver of the electric vehicle performing one or more actions associated with providing the payment information to a charging network providing the charging station.

In operation 930, the charging interface system 125 authorizes a second amount of charge to be provided to the electric vehicle in response to receiving payment information associated with charging the electric vehicle at the charging station. For example, the authorization module 950 may authorize charging services once payment information for an electric vehicle is received and/or verified, as described herein, among other things.

Various devices and/or components may perform the pre-authorization operations described herein. For example, the charging station may authorize the first amount of charge to be provided to the electric vehicle and may authorize the second amount of charge to be provided to the electric vehicle, the charging network providing the charging station may authorize the first amount of charge to be provided to the electric vehicle and may authorize the second amount of charge to be provided to the electric vehicle, and/or a third party network that provides an interface between the electric vehicle and the charging station may authorize the first amount of charge to be provided to the electric vehicle and may authorize the second amount of charge to be provided to the electric vehicle, among other scenarios.

Thus, in some embodiments, the charging interface system 125 conditionally authorizes charging of an electric vehicle during an authorization or payment process (e.g., a "first" or "initial" amount of charge) and continues the authorization of the charging of the electric vehicle once the authorization or payment process (e.g., a "second" or "continued" amount of charge) is successful.

Figure 10:
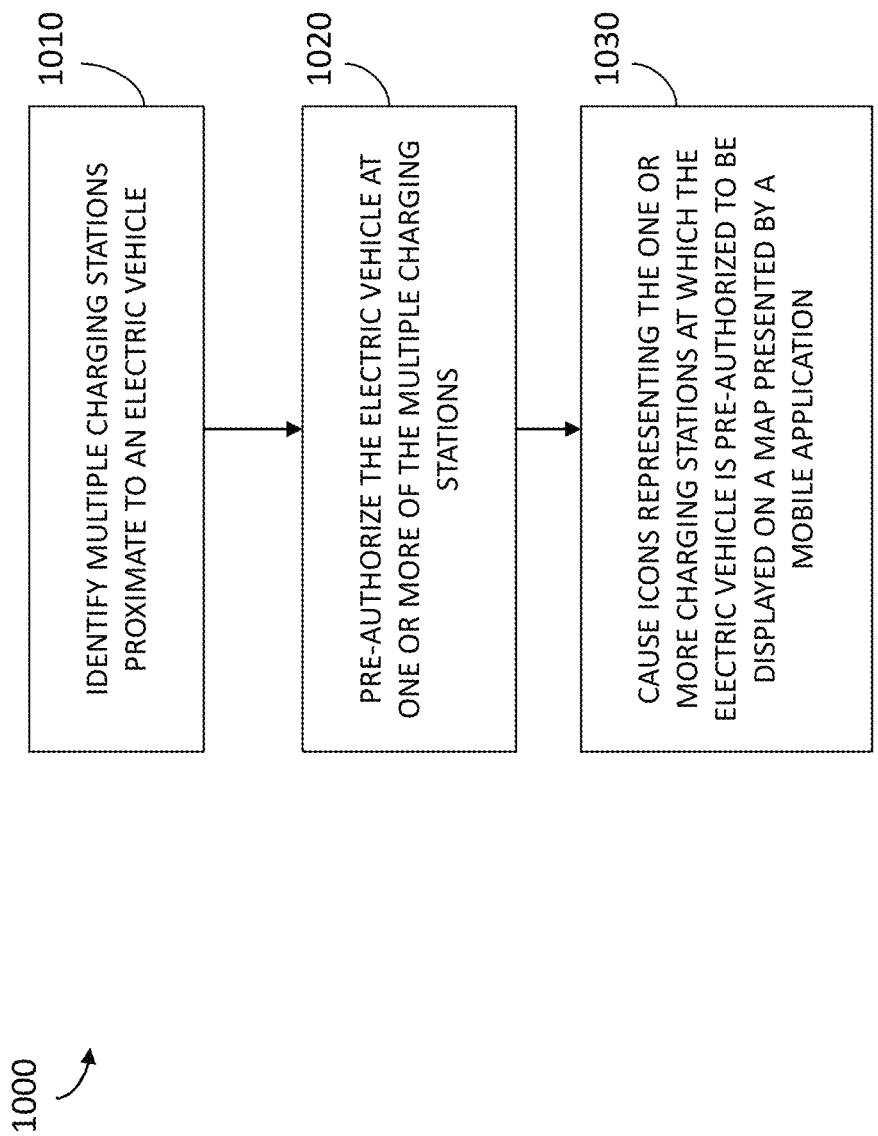
FIG. 10 is a flow diagram illustrating a method for presenting a map of charging station information.

As described herein, the mobile application 127, in some embodiments, may present information (e.g., via a displayed map) identifying charging stations that accept or provide the pre-authorization of electric vehicles. FIG. 10 is a flow diagram illustrating a method 1000 for presenting a map of charging station information.

In operation 1010, the mobile application 127 identifies multiple charging stations proximate to an electric vehicle. In operation 1020, the mobile application pre-authorizes the electric vehicle at one or more of the multiple charging stations. For example, the mobile application 127 may identify charging stations associated with charging networks that pre-authorize electric vehicles, may provide payment information to the multiple, disparate charging networks providing the one or more charging stations on behalf of a driver of an electric vehicle, and so on.

In operation 1030, the mobile application 127 causes icons representing the one or more charging stations at which the electric vehicle is pre-authorized to be displayed on a map presented by the mobile application via a user interface of a mobile device that supports the mobile application.

For example, the mobile application 127 may cause the icons representing the one or more charging stations at which the electric vehicle is pre-authorized to be displayed in a first configuration, and may cause icons representing charging stations at which the electric vehicle is not pre-authorized to be displayed in a second configuration.

Figure 11:
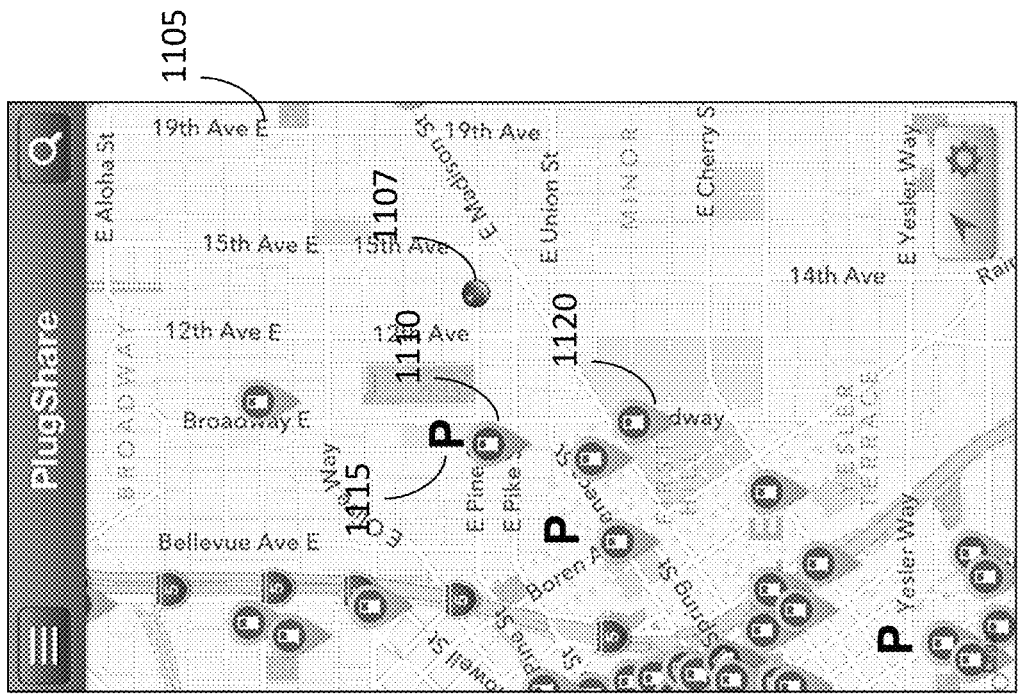
FIG. 11 is a display diagram illustrating a map of charging station information that is presented by a mobile application.

As described herein, the mobile application 127 may, in collaboration with the charging interface system 125, render, display, and/or present (or, cause to present) various information via displayed maps. For example, FIG. 11 depicts an example user interface 1100 displaying a map of charging station information. As shown in FIG. 11, the user interface 1100 displays a map 1105 of a geographical location surrounding an electric vehicle or driver location, which is represented by icon 1107. The map displays information for various available charging stations, such as icons 1110 for pre-authorized charging stations that include symbols 1115 that indicate electric vehicle is pre-authorized at the charging stations, as wells as icons 1120 for charging stations that are not pre-authorized.

Of course, the user interface 1110 may display other maps and/or other types of information within the map, such as rating information for the charging stations, route information to the charging stations, different types or configurations of symbol 1115 and/or icon 1110 or 1120, and so on.

Thus, in the various embodiments described herein, the charging interface system 125 enables a driver of an electric vehicle to simply and efficiently access and pay to use a charging station by providing an interface that minimizes the difficulties associated with following the requirements, protocols, and/or procedures for using the charging station that are dictated by the charging network providing the charging station. Such an interface may reduce the annoyances associated with interacting numerous, disparate types of charging networks and protocols, such as annoyances associated with delayed or unsuccessful charging sessions, privacy, and so on.

Examples of Providing an Interface to Electric Vehicle Charging Services

As described herein, in some embodiments, the charging interface system 125 includes and/or provides a device, such as a computing or mobile device, at a location that includes multiple charging stations, such as multiple charging stations provided by one or more charging networks. For example, the charging interface system 125 may provide and/or include a device located within a parking garage that facilitates the access, authorization, and/or payment for services (e.g., charging) rendered by the charging stations within the parking garage to electric vehicles, among other things.

Figure 12:
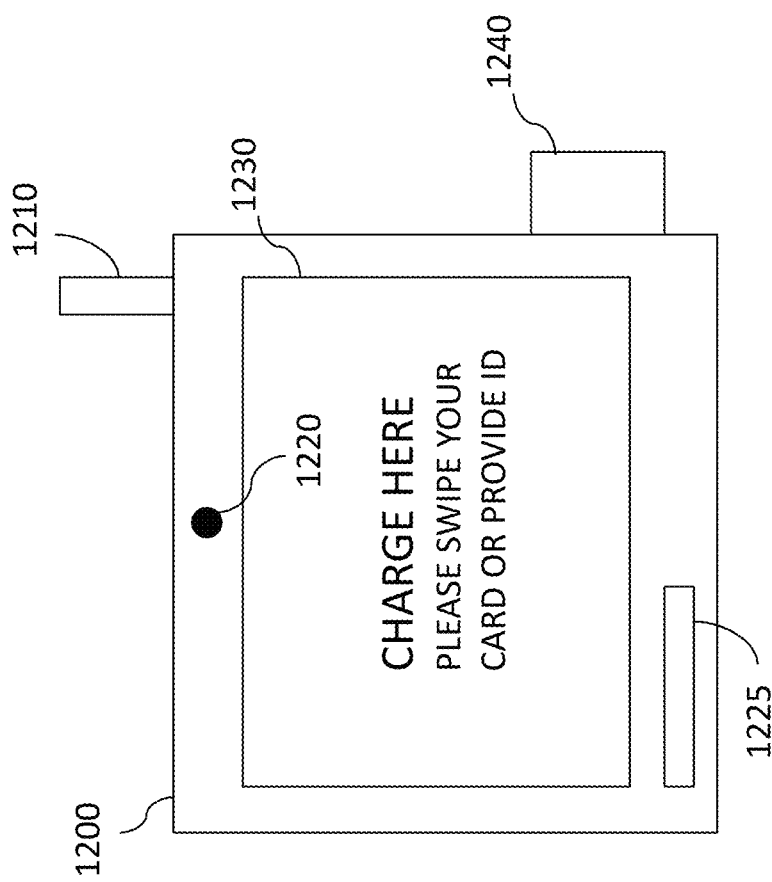
FIG. 12 is a block diagram illustrating a device for facilitating access to multiple charging stations at a location.

FIG. 12 is a block diagram illustrating a device 1200 for facilitating access to multiple charging stations at a location. In some embodiments, the device 1200 acts as a physical or hardware interface between drivers or other users associated with electric vehicles and the charging stations (and associated charging networks) provided at a location.

The device 1200 includes a communication component 1210, such as an a wireless antenna, Bluetooth component, or other component that facilitates the communication of information between the device 1200 and charging stations at a location and/or between the device 1200 and a mobile device, such as the mobile device 110 running the mobile application 127 that is associated with the charging interface system 125.

The device 1200 may also include information capture components, such as a camera 1220 or other imaging components, a bar code component or other information scanners 1225, a magnetic stripe reader 1240, and so on. The information capture components 1220, 1225, 1240 may facilitate the input of information to the device 1220, such as payment information, driver or electric vehicle identification information, authorization codes or other information, and so on.

The device 1200 may also include information display components, such as a user interface 1230. The user interface 1230, which may be a touch screen or other display, may present information associated with one or more available charging stations at a location that includes the device 1200. The user interface 1230 may also act to capture information, such as information input to the device 1200 via the user interface 1230 by a driver of an electric vehicle.

Figure 13:
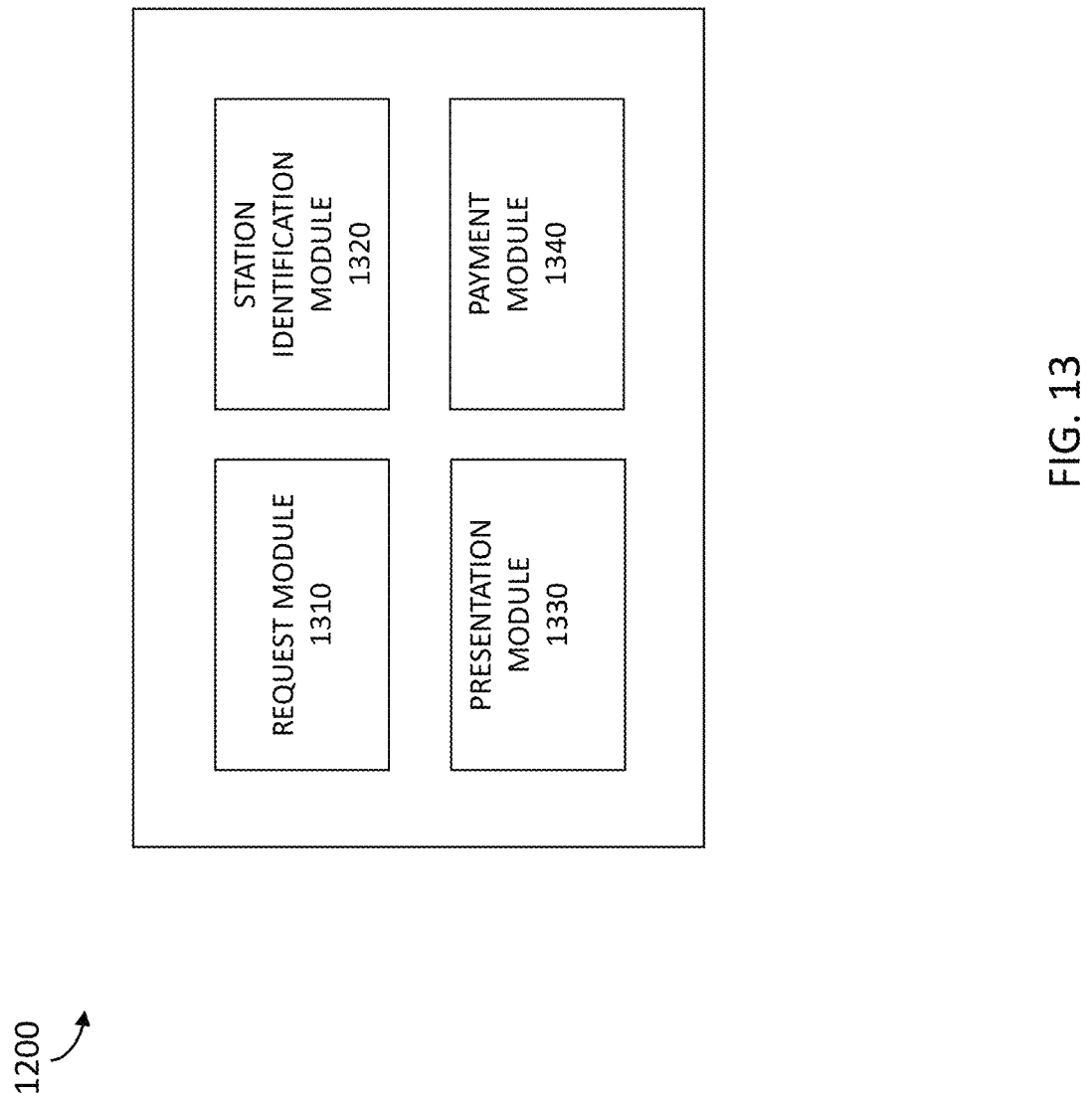
FIG. 13 is a block diagram illustrating a station match system.

As described herein, the device 1200 may facilitate the access, authorization, and/or payment associated with charging an electric vehicle at a charging station in communication or otherwise networked to the device 1200. FIG. 13 is a block diagram illustrating a station match system 1300 that facilitates the matching of an electric vehicle to an available charging station.

As illustrated in FIG. 13, the station matching system 1300 includes a variety of functional modules, such as a request module 1310, a station identification module 1320, a presentation module 1330, and a payment module 1340. One skilled in the art will appreciate that the functional modules are implemented with a combination of software (e.g., executable instructions, or computer code) and hardware (e.g., at least a memory and processor). Accordingly, as used herein, in some embodiments a module is a processor-implemented module and represents a computing device having a processor that is at least temporarily configured and/or programmed by executable instructions stored in memory to perform one or more of the particular functions that are described herein.

In some embodiments, the request module 1310 is configured and/or programmed to receive a request to charge an electric vehicle at one of the multiple charging stations provided at a location. For example, the request module may receive a request from a driver of an electric vehicle via input received at the user interface 1230, via a request received by the mobile application 127 and transmitted to the device 1200, via a capture of information from a driver of an electric vehicle using one of the information capture components 1220, 1225, 1240, and so on.

In some embodiments, the identification module 1320 is configured and/or programmed to identify an available charging station at the location. For example, the identification module 1320 may poll or otherwise query the charging stations at the location in order to identify or determine the charging stations that are available for use.

When determining whether a charging station is in use or otherwise available, the identification module 1320 may identify a charging station as an available charging station when the charging station is not currently connected to an electric vehicle, when the charging station is not currently reserved by an owner of an electric vehicle, when determining a car is not currently parked proximate to the charging station (e.g., via information provided by a camera or other sensor at the charging station), and so on.

In some embodiments, the information module 1330 is configured and/or programmed to present information associated with the available charging station. For example, the information module 1330 may present information identifying the available charging station along with information associated with authorizing the electric vehicle to charge with the available charging station, such as an authorization code.

The information module 1330 may present the information via the user interface 1330 and/or via the mobile application 127 in communication with the device and supported by the mobile device 110 associated with a driver of the electric vehicle. As described herein, the presented information may include an identification of the available or matched charging station, information associated with rates charged by the charging station, information indicating a location of the charging station, and so on.

In some embodiments, the payment module 1340 is configured and/or programmed to receive payment information that accompanies a request to charge the electric vehicle and authorize a charging event for the electric vehicle with the available charging station on behalf of a charging network providing the charging station. For example, the payment module 1340 may authorize a charging event or charging session at one of a group of disparate charging stations that include at least one charging station provided by a first charging network and at least one charging station provided by a second, different, charging network.

In some embodiments, the payment module 1340 may include a reservation module that is configured to reserve the available charging station on behalf of a driver of the electric vehicle. For example, upon matching an available charging station to an electric vehicle, the payment module 1340, via the reservation module, may automatically or temporarily reserve the charging station on behalf of the driver of the electric vehicle.

Figure 14:
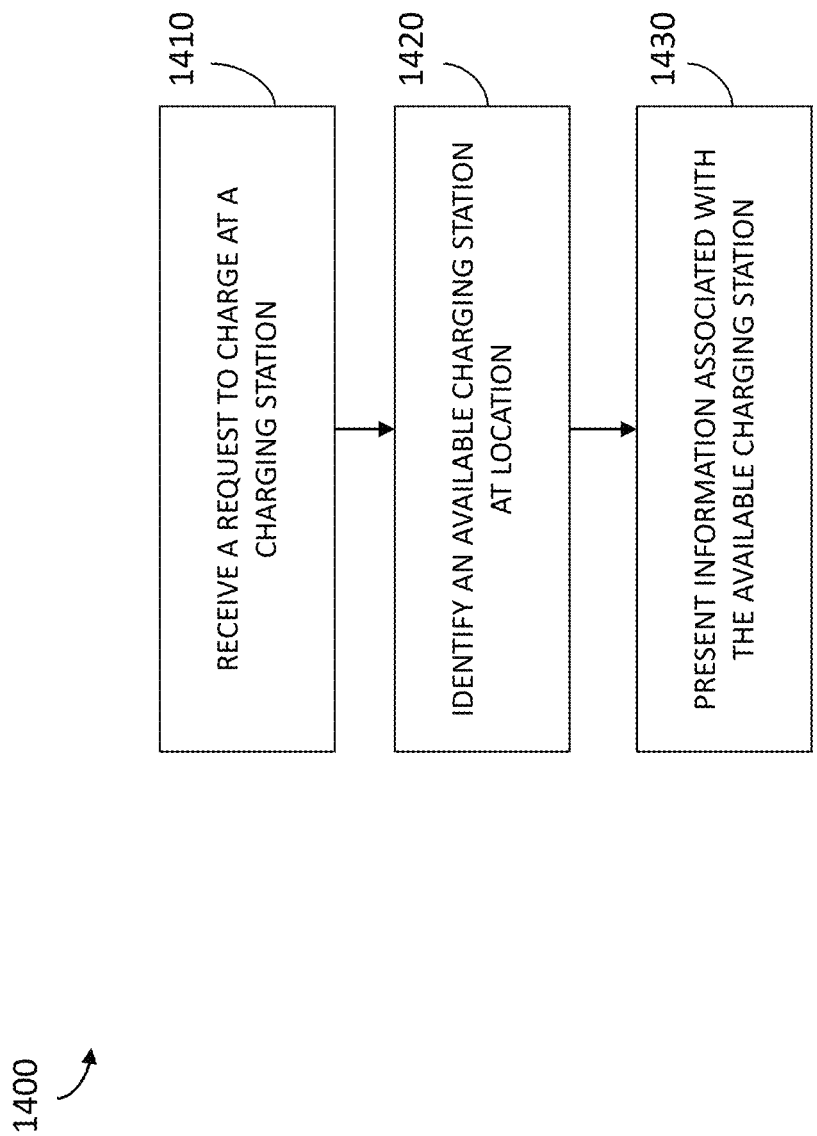
FIG. 14 is a flow diagram illustrating a method of matching a charging station to an electric vehicle.

As described herein, in some embodiments, the device 1200 associated with the station matching system 1300 performs various methods or other operations to match an electric vehicle to a charging station at a location. FIG. 14 is a flow diagram illustrating a method 1400 of matching a charging station to an electric vehicle.

In operation 1410, the station matching system 1300 receives a request to charge an electric vehicle at one of multiple charging stations provided at the certain location. For example, the request module may receive a request from a driver of an electric vehicle via input received at the user interface 1230, via a request received by the mobile application 127 and transmitted to the device 1200, via a capture of information from a driver of an electric vehicle using one of the information capture components 1220, 1225, 1240, and so on.

In operation 1420, the station matching system 1300 identifies an available charging station at the certain location. In some embodiments, the identification module 1320 is configured and/or programmed to identify an available charging station at the location. For example, the identification module 1320 may poll or otherwise query the charging stations at the location in order to identify or determine the charging stations that are available for use.

When determining whether a charging station is in use or otherwise available, the identification module 1320 may identify a charging station as an available charging station when the charging station is not currently connected to an electric vehicle, when the charging station is not currently reserved by an owner of an electric vehicle, when determining a car is not currently parked proximate to the charging station (e.g., via information provided by a camera or other sensor at the charging station), and so on.

In operation 1430, the station matching system 1300 presents information associated with the available charging station. For example, the information module 1330 may present information identifying the available charging station along with information associated with authorizing the electric vehicle to charge with the available charging station, such as an authorization code.

The information module 1330 may present the information via the user interface 1330 and/or via the mobile application 127 in communication with the device and supported by the mobile device 110 associated with a driver of the electric vehicle. As described herein, the presented information may include an identification of the available or matched charging station, information associated with rates charged by the charging station, information indicating a location of the charging station, and so on.

Figure 15:
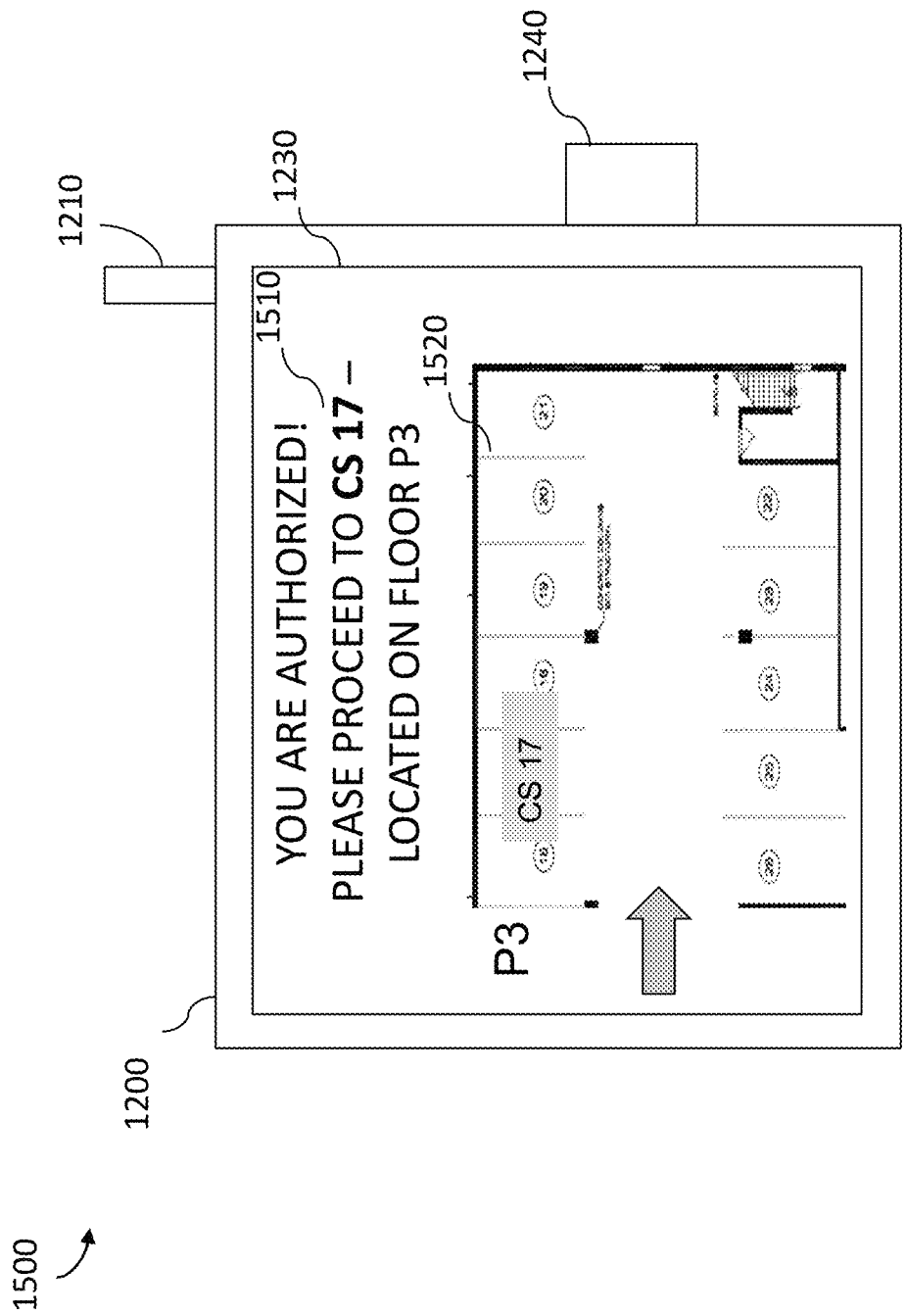
FIG. 15 is a display diagram illustrating an example user interface presented by a device that matches an electric vehicle to a charging station.

For example, FIG. 15 depicts an example user interface 1500 presented by the device 1200 that matches an electric vehicle to a charging station. The example user interface 1500 includes information 1510 identifying the available charging station matched to an electric vehicle as well as information 1520 displaying a location of the charging station at the location (e.g., a symbol within a displayed map of a parking garage location).

As described herein, in some embodiments, the station matching system 1300 may authorize or facilitate the payment of charging services between an electric vehicle and a charging station or charging network providing the charging station.

For example, the station matching system 1300, via the payment module 1340, may receive payment information that accompanies the request to charge the electric vehicle and authorize a charging event for the electric vehicle with the available charging station on behalf of a charging network providing the charging station. The payment module 1340 may also automatically reserve the available charging station on behalf of a driver of the electric vehicle, and/or cause an indicator at the available charging station to indicate the available charging station is reserved for use by the electric vehicle.

Thus, in some embodiments, the charging interface system 125 provides a device 1200 that determines one or more charging stations at a location are available to charge an electric vehicle, receives payment information associated with the electric vehicle to be charged by one of the one or more available charging stations, and authorizes the electric vehicle at one of the one or more available charging stations based on the received payment information.

The device 1200, therefore, may act as an interface between a variety of similar or different charging stations at a single location (e.g., a parking garage, lot, city block, building, and so on), and a driver of an electric vehicle seeking to charge at an available charging station, among other things.

Examples of Sharing a Charger Between Electric Vehicles

As described herein, in some embodiments, the charging interface system 125 facilitates the sharing of a charging station between electric vehicles, such as between two electric vehicles parked proximate to the charging station. For example, the charging interface system 125 may facilitate the communication of information (e.g., messages or other indicators) between the drivers of the two electric vehicles, such that one driver may connect the other driver's electric vehicle to the charging station when the other driver is not present at the charging station.

Figure 16:
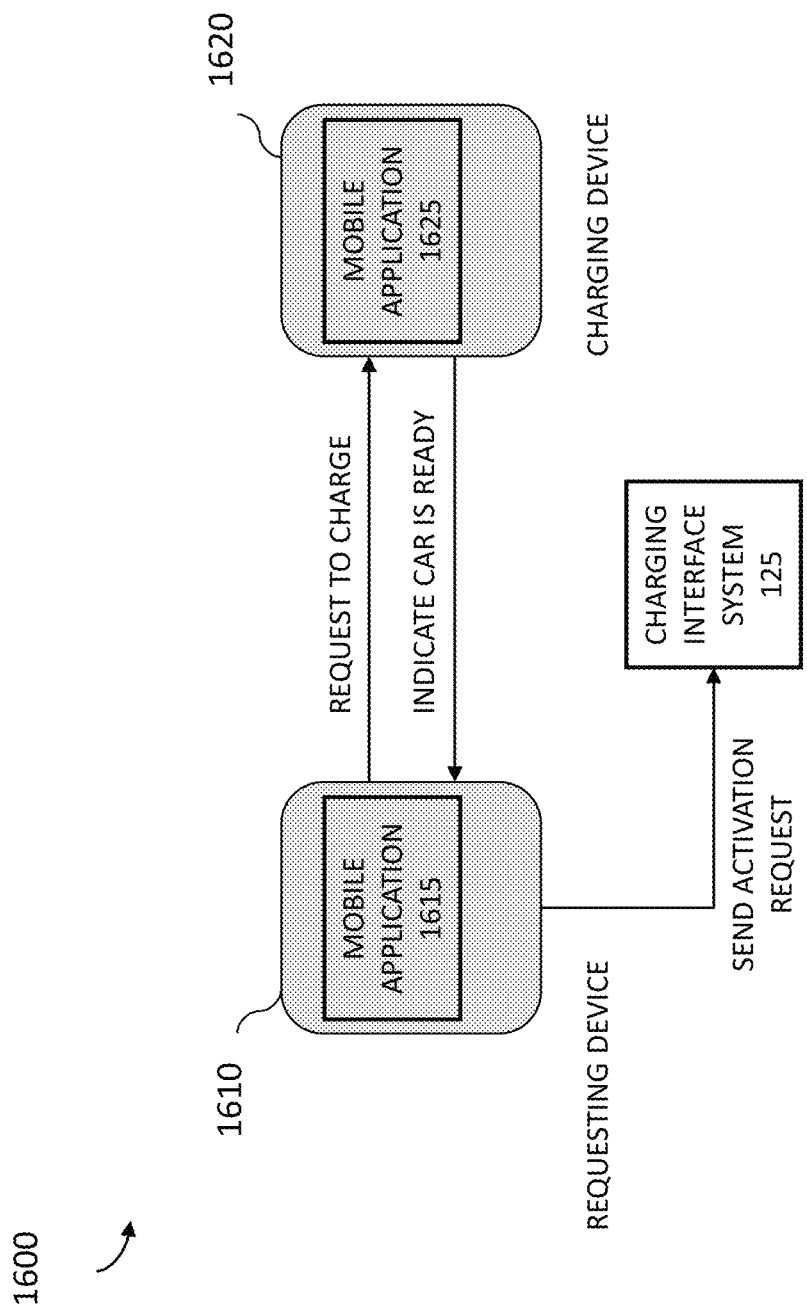
FIG. 16 is an information flow diagram illustrating a flow of information when sharing a charging station between electric vehicles.

FIG. 16 is an information flow diagram 1600 illustrating a flow of information when sharing a charging station between electric vehicles. A mobile application 1615 associated with the charging interface system 125 and supported by a mobile device 1610 of a first driver of an electric vehicle transmits a request to charge his/her vehicle when a charging station is available. For example, when the first driver parks at the charging station, another electric vehicle, such as an electric vehicle of a second driver that is associated with a mobile application 1625 supported by a mobile device 1620, is already parked at the charging station and actively or currently connected to and receiving energy from the charging station.

The charging interface system 125, therefore, transmits the request from the first driver to the mobile application 1625 of the second driver, alerting the second driver that the first driver would like to charge at the charging station when the current charging session is complete.

Once complete, the second driver removes the connection between his electric vehicle and the charging station and connects the charging station to the electric vehicle associated with the first driver. Once connected, the second driver sends a message via the charging interface system 125 to the mobile application 1615 of the first driver that his electric vehicle is now connected to the charging station. The first driver, who is not located at the charging station, receives the message at his/her mobile application 1615 and transmits a request to activate the charging station and begin a charging session with his/her electric vehicle.

Figure 17:
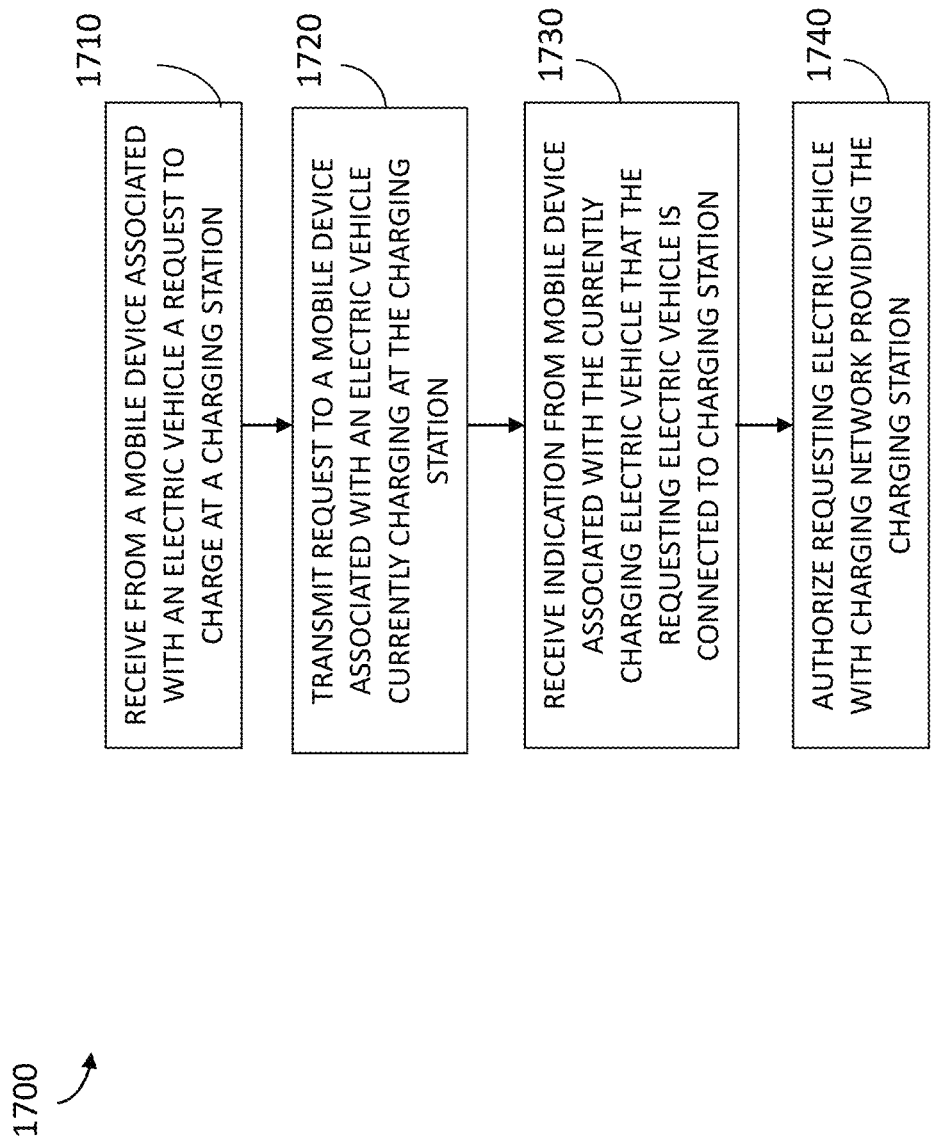
FIG. 17 is a flow diagram illustrating a method of authorizing an electric vehicle at a charging station.

Thus, the charging interface system 125 facilitates the sharing of a charger between electric vehicles. FIG. 17 is a flow diagram illustrating a method 1700 of authorizing an electric vehicle at a charging station.

In operation 1710, the charging interface system 125 receives from a mobile device associated with a first electric vehicle a request to charge at a charging station. In operation 1720, the charging interface system 125 transmits the request to a mobile device associated with a second electric vehicle currently charging at the charging station. In operation 1730, the charging interface system 125 receives an indication from the mobile device associated with the second electric vehicle that the first electric vehicle is connected to the charging station. In operation 1740, the charging interface system 1740 authorizes the first electric vehicle with a charging network providing the charging station to charge at the charging station.

Thus, in some embodiments, the charging interface system 125 enables drivers to communicate with one another in order to share charging stations, among other things. The charging interface system 125 may facilitate and monitor the communication in order to automatically reserve, authorize, or begin charging an electric vehicle, such as an electric vehicle parked at a charging station and waiting to share the charging station with another electric vehicle, even when the driver of the electric vehicle is not present or at the location of the charging station.

Examples of Incentivizing Providers of Charging Stations

Figure 18:
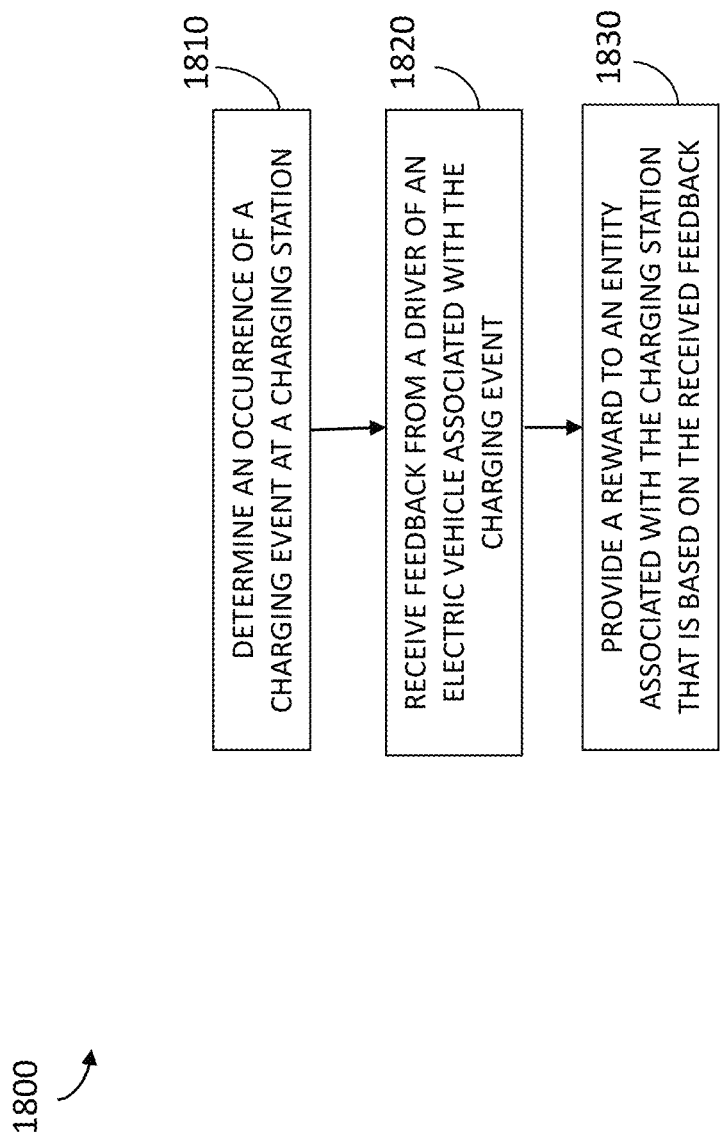
FIG. 18 is a flow diagram illustrating a method of incentivizing a charging station provider.

As described herein, in some embodiments, the charging interface system 125 may provide awards, rewards, and/or other incentives to entities that provide charging stations. For example, the charging interface system 125 may provide a system and method for incentivizing charging station owners, such as individuals who provide home or non-networked charging stations. FIG. 18 is a flow diagram illustrating a method 1800 of incentivizing a charging station provider.

In operation 1810, the charging interface system 1810 determines an occurrence of a charging event at a charging station. For example, the charging interface system 125 may facilitate the authorization and/or payment of a charging event or session between an electric vehicle and a charging station, and when the charging session commences, determine a charging event has occurred at the charging station. As another example, the charging interface system 125 may query the charging station, and/or an owner or providing network of the charging station for session data, such as information indicating a day and time of charging sessions, information identifying the duration of charging sessions, information identifying the electric vehicles associated with the charging sessions, and so on.

In operation 1820, the charging interface system 125 receives feedback from a driver of an electric vehicle associated with the charging event. For example, the charging interface system 125 may receive rating or review information from the driver of the electric vehicle 110 via the mobile application 127 that is associated with the driver. The rating or review information may include the ease or functionality of the charging station, the use of the charging station, the cost of the charging station, the accuracy of information provided by the charging station, and so on.

In operation 1830, the charging interface system 1830 provides a reward to an entity associated with the charging station that is based on the received feedback. For example, the charging interface system 125 may provide points, credits, or other discounts or rewards to a driver of an electric vehicle that provides his/her home as a charging station. The rewards may include credits towards charging at charging stations facilitated and/or managed by the charging interface system 125. For example, drivers may tip or otherwise provide positive feedback for a driver of an electric vehicle that allows other drivers to charge at his/her home charging station. The driver may then use points or credits earned from the tips and positive feedback to offset the costs associated with charging at public or charging network based charging stations.

As another example, the charging interface system 125 may provide other rewards to charging station providers having high or good reviews, such as rewards from advertisers, gifts, and so on.

Thus, in some embodiments, the charging interface system 125 may facilitate a currency or points exchange program between various users associated with the system, enabling users of charging stations to reward users providing charging stations, which may encourage other users to provide charging stations, among other benefits.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the system is not intended to be exhaustive or to limit the system to the precise form disclosed above. While specific embodiments of, and examples for, the system are described above for illustrative purposes, various equivalent modifications are possible within the scope of the system, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

While many embodiments described above employ software stored on the mobile device, the scripts and other software noted above may be hard coded into the mobile device (e.g. stored in EEPROM, PROM, etc.). Further, the above functionality may be implemented without scripts or other special modules.

The teachings of the system provided herein can be applied to other systems, not necessarily the system described above. The elements and acts of the various embodiments described above can be combined to provide further embodiments.

All of the above patents and applications and other references, including any that may be listed in accompanying filing papers, are incorporated by reference. Aspects of the system can be modified, if necessary, to employ the systems, functions, and concepts of the various references described above to provide yet further embodiments of the system.

These and other changes can be made to the system in light of the above Detailed Description. While the above description details certain embodiments of the system and describes the best mode contemplated, no matter how detailed the above appears in text, the system can be practiced in many ways. Details of the local-based support system may vary considerably in its implementation details, while still being encompassed by the system disclosed herein. As noted above, particular terminology used when describing certain features or aspects of the system should not be taken to imply that the terminology is being redefined herein to be restricted to any specific characteristics, features, or aspects of the system with which that terminology is associated. In general, the terms used in the following claims should not be construed to limit the system to the specific embodiments disclosed in the specification, unless the above Detailed Description section explicitly defines such terms. Accordingly, the actual scope of the system encompasses not only the disclosed embodiments, but also all equivalent ways of practicing or implementing the system under the claims.

While certain aspects of the system are presented below in certain claim forms, the inventors contemplate the various aspects of the system in any number of claim forms. Accordingly, the inventors reserve the right to add additional claims after filing the application to pursue such additional claim forms for other aspects of the system.

We claim:

1. A system comprising:
    multiple charging stations provided at a physical location, including at least one charging station provided by a first charging network and at least one charging station provided by a second, different charging network; and
    a hardware device at the physical location that communicates over a network with the multiple charging stations provided at the physical location; and
    wherein the hardware device includes:
        a communication component that facilitates communication between the hardware device and the multiple charging stations at the physical location;
        a user interface that presents information about the multiple charging stations at the physical location;
        one or more information capture components that capture information from a driver of an electric vehicle seeking to charge the electric vehicle at one of the multiple charging stations;
        a charging network protocol database that stores registration protocol information and payment protocol information for the first charging network and the second, different charging network; and
        a station matching system including multiple processor-implemented modules, the modules including:
            a request module that receives a request to charge an electric vehicle at one of the multiple charging stations provided at the physical location upon a capture of information from the driver of the electric vehicle using the one or more capture components;
            an identification module that identifies an available charging station at the physical location by polling the multiple charging stations over the network and receiving information back from each of the multiple charging stations that indicates whether a charging station is an available charging station;
            an information module that presents information associated with the available charging station via the user interface of the hardware device, wherein the presented information includes a symbol representing the available charging station displayed by a map of the physical location and route information to the available charging station; and
            a payment module that receives payment information that accompanies the request to charge the electric vehicle, and authorizes a charging event for the electric vehicle with the available charging station on behalf of a charging network providing the available charging station; wherein the payment module authorizes the charging event for the electric vehicle with the available charging station using the registration protocol information and the payment protocol information of the charging network providing the available charging station stored in the charging network protocol database of the hardware device.

2. The system of claim 1, wherein the identification module is configured to identify a charging station as an available charging station when a response to the poll indicates the charging station is not currently connected to an electric vehicle.

3. The system of claim 1, wherein the identification module is configured to identify a charging station as an available charging station when a response to the poll indicates the charging station is not currently reserved by an owner of an electric vehicle.

4. The system of claim 1, wherein the identification module is configured to identify a charging station as an available charging station when a response to the poll indicates a car is not currently parked proximate to the charging station.

5. The system of claim 1, wherein the information module is configured to present information identifying the available charging station along with information associated with authorizing the electric vehicle to charge with the available charging station.

6. The system of claim 1, further comprising:
a reservation module that automatically reserves the available charging station on behalf of the driver of the electric vehicle.

7. The system of claim 1, wherein the information capture component is an imaging component, magnetic stripe reader, or bar code reader; and wherein the request module receives the request upon capturing information from the driver of the electric vehicle using the imaging component, the magnetic stripe reader, or the bar code reader.

8. The system of claim 1, wherein the physical location is a parking garage or a parking lot, and wherein the hardware device and all of the multiple charging stations are located within the parking garage or parking lot.

9. The system of claim 1, wherein the hardware device is at a location within the physical location that is different than locations of the multiple charging stations provided at the physical location.

* * * * *